(12) United States Patent
Slattery et al.

(10) Patent No.: US 7,353,978 B2
(45) Date of Patent: Apr. 8, 2008

(54) METHOD OF MAKING TAILORED BLANKS USING LINEAR FRICTION WELDING

(75) Inventors: Kevin T. Slattery, St. Charles, MO (US); Christopher H. Swallow, Kirkwood, MO (US); Loren J. Strahm, Florissant, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/250,082

(22) Filed: Oct. 13, 2005

(65) Prior Publication Data

US 2007/0090155 A1  Apr. 26, 2007

(51) Int. Cl.
B23K 20/12 (2006.01)
B29C 65/06 (2006.01)

(52) U.S. Cl. ............ 228/112.1; 228/2.1; 156/73.5
(58) Field of Classification Search ......... 228/112.1, 228/2.1, 110.1, 113
See application file for complete search history.

(56) References Cited

U.S. PATENT DOCUMENTS

| | | | | |
|---|---|---|---|---|
| 3,785,096 A * | 1/1974 | Neuhardt | ............ | 52/79.4 |
| 4,791,964 A * | 12/1988 | Van Kirk et al. | ............ | 138/115 |
| 4,875,310 A * | 10/1989 | Shaughnessy | ............ | 52/81.1 |
| 5,813,593 A * | 9/1998 | Galaske, Jr. | ............ | 228/112.1 |
| 5,849,393 A * | 12/1998 | Slattery | ............ | 428/172 |
| 6,119,409 A * | 9/2000 | Makar et al. | ............ | 52/67 |
| 6,142,360 A * | 11/2000 | Hutt | ............ | 228/114.5 |
| 6,382,498 B2 * | 5/2002 | Aota et al. | ............ | 228/112.1 |
| 6,735,916 B2 * | 5/2004 | Peshkam et al. | ............ | 52/650.1 |
| 6,779,708 B2 | 8/2004 | Slattery | ............ | 228/112.1 |
| 6,910,616 B2 | 6/2005 | Halley et al. | ............ | 228/112.1 |
| 7,083,076 B2 * | 8/2006 | Slattery | ............ | 228/2.3 |
| 2003/0168494 A1 * | 9/2003 | Halley et al. | ............ | 228/112.1 |
| 2004/0004108 A1 * | 1/2004 | Halley et al. | ............ | 228/56.3 |
| 2004/0112941 A1 * | 6/2004 | Slattery | ............ | 228/112.1 |
| 2004/0256440 A1 * | 12/2004 | Slattery | ............ | 228/112.1 |
| 2005/0127140 A1 | 6/2005 | Slattery | ............ | 228/112.1 |
| 2006/0029462 A1 * | 2/2006 | Patberg | ............ | 403/171 |
| 2006/0254188 A1 * | 11/2006 | Aota et al. | ............ | 52/643 |

* cited by examiner

*Primary Examiner*—Kiley Stoner
(74) *Attorney, Agent, or Firm*—Ostrager Chong Flaherty & Broitman P.C.

(57) ABSTRACT

A method of making tailored blanks in accordance with one embodiment comprises the steps of friction welding a first joining surface of a first structural member having a substantially non-rectangular parallelogram profile to a first portion of a joining surface of a substrate; and thereafter concurrently linear friction welding first and second joining surfaces of a second structural member having a substantially non-rectangular parallelogram profile to a second portion of the surface of the substrate and to a second joining surface of the first structural member respectively. The first and second portions of the surface of the substrate are adjacent. Two or more structural members having a substantially non-rectangular parallelogram profile can be linear friction welded in succession to the substrate and to each other, thereby building a structural assembly having a long flange or other long feature of a desired length.

12 Claims, 6 Drawing Sheets

METHOD OF MAKING TAILORED BLANKS USING LINEAR FRICTION WELDING

BACKGROUND OF THE INVENTION

This invention relates to friction welding and, more specifically, to friction welding of one or more structural members to form a tailored blank.

Structural devices are often formed as assemblies of a number of smaller structural members. Such assembling of individual members may be necessary to form devices that are too large or too complicated to be formed by conventional manufacturing methods. For example, such factors as casting sizes, forging sizes, available plate and block sizes, and the like can limit the size and geometry of the structural members that can be manufactured. To form larger or more complex devices, the structural members are typically assembled by joining the individual structural members using a variety of known joining techniques including, for example, mechanical fastening or welding.

Joints formed by mechanical fasteners such as rivets, screws, and bolts typically require an overlap of the structural materials at the joint. The fasteners and the overlap of material result in an increase in weight of the joint and the structural assembly. The joint can also introduce areas of increased stress, for example, around holes drilled for receiving rivets. Alternatively, weld joints can be formed to join the structural members, sometimes requiring little or no overlap of material. However, the formation of conventional weld joints, such as by arc or electron beam welding, can result in undesirable dimensional changes in the structural members. Welding can also introduce porosity or other discontinuities into the structural members or otherwise cause unwanted changes to the material properties of the structural members.

Friction welding has also been proposed as an alternative to conventional welding methods for joining members. Linear friction welding, and rotational friction welding can be used to form strong joints without reducing the mechanical characteristics of the joined materials or causing significant dimensional changes. Conventional linear friction welding and rotational friction welding require one member to be moved, i.e. oscillated or rotated, and urged against the other member.

It is known to friction weld structural members together to make a tailored blank that is later machined. Typically the tailored blank approximates the desired dimensions and configuration of the final structural assembly and therefore requires little machining or other subsequent processing to form the final structural assembly. There is a need for improvements in the art of friction welding structural members to make such tailored blanks.

BRIEF DESCRIPTION OF THE INVENTION

The invention is directed to methods of friction welding structural elements to make tailored blanks that can be further processed into final structural assemblies. The invention is also directed to the resulting tailored blanks.

One aspect of the invention is a method of making a tailored blank comprising the following steps: (a) friction welding a first joining surface of a first structural member having a substantially non-rectangular parallelogram-shaped profile to a first portion of a surface of a substrate; and (b) concurrently linear friction welding first and second joining surfaces of a second structural member having a substantially non-rectangular parallelogram-shaped profile to a second portion of the surface of the substrate and to a second joining surface of the first structural member respectively, wherein the first and second portions of the surface of the substrate are adjacent.

Another aspect of the invention is a method of making a tailored blank comprising the following steps: (a) friction welding a first joining surface of a first structural member to a first portion of a joining surface of a substrate; and (b) concurrently linear friction welding first and second joining surfaces of a second structural member to a second portion of the surface of the substrate and to a second joining surface of the first structural member respectively, wherein the first and second portions of the surface of the substrate are adjacent, and the second joining surfaces of the first and second structural members are substantially planar, mutually substantially parallel and substantially normal to the substrate.

A further aspect of the invention is a method of making tailored blanks comprising the following steps: (a) placing a first structural member having a cross section that is substantially non-rectangular parallelogram shaped in abutting relationship with a structure comprising first and second surfaces disposed at an oblique angle, the first structural member comprising first and second surfaces that intersect at the oblique angle, a third surface substantially parallel to the first surface, and a fourth surface substantially parallel to the second surface, the first surface of the first structural member abutting a first portion of the first surface of the structure and the second surface of the first structural member abutting the second surface of the structure; (b) applying a force on the first structural member to respectively urge the first and second surfaces of the first structural member against the first and second surfaces of the structure; and (c) alternatingly displacing the first structural member in mutually opposite directions substantially parallel to the longitudinal axis of the first structural member while step (b) is being performed, causing frictional heat to be generated at a first interface where the first surfaces of the structure and the first structural member rub together and at a second interface where the second surfaces of the structure and the first structural member rub together, wherein step (c) is halted after material at the first and second interfaces becomes plasticized and while step (b) is being performed, step (b) being continued until the plasticized material at the first and second interfaces forms a weld.

Yet another aspect of the invention is a tailored blank comprising a substrate, a first structural member having a substantially non-rectangular parallelogram-shaped profile, a second structural member having the same substantially non-rectangular parallelogram-shaped profile, a first weld joint joining the first structural member to the substrate, a second weld joint joining the second structural member to the substrate, and a third weld joint joining the first structural member to the second structural member, the first and second weld joints being substantially coplanar, and the third weld joint being substantially planar and disposed at an acute angle relative to the first and second weld joints.

A further aspect of the invention is a tailored blank comprising a substrate, a first structural member having a polygonal profile, a second structural member having a substantially parallelogram-shaped profile, a first weld joint joining the structural member to the substrate, a second weld joint joining the second structural member to the substrate, and a third weld joint joining the first structural member to the second structural member, the first and second weld joints being substantially coplanar, and the third weld joint being substantially planar and disposed at an acute angle relative to the first and second weld joints.

Other aspects of the invention are disclosed and claimed below.

DETAILED DESCRIPTION OF THE INVENTION

Figure 1:
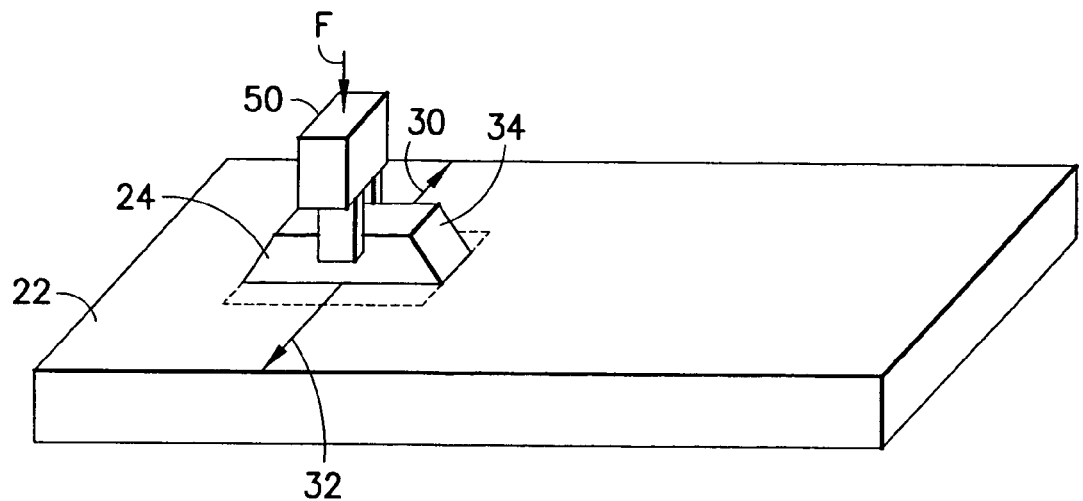
FIG. 1 is a drawing showing an isometric view of a first stage in the manufacture of a tailored blank in accordance with a first embodiment of the present invention wherein a first structural member is being joined to a base member or substrate by friction welding.

In a linear friction welding process, respective surfaces of two parts are placed in contact with each other to form an interface and then rubbed together in a reciprocating manner. This is accomplished by moving at least one of the parts back and forth along a line. As the parts are rubbed, compressive force is applied to place the interface under high pressure. At the interface, frictional heat is generated and material from each part plasticizes. Some of this material flows out from between the parts (flash flow), resulting in gradual decrease in the thickness, i.e. the dimension in the direction in which pressure is applied (the dimension normal to the interface) of the parts. When the process is terminated, flash flow ceases, and at the interface, the remaining plastic state material of each part forms a weld, thereby joining the two parts together.

The present invention involves a linear friction welding process wherein two non-parallel surfaces of one structural member are concurrently welded to respective surfaces of an intermediate tailored blank structure. In the embodiments disclosed herein, the intermediate tailored blank structure is itself formed by linear friction welding two structural members together. Various embodiments of the invention will be described with reference to the drawings, in which similar elements in different drawings bear the same reference numerals.

In accordance with a first embodiment of the invention, a tailored blank having a long flange or other long feature attached to a base member or substrate can be made by friction welding. The long feature in accordance with the first embodiment comprises one or more structural members in the form of a parallelepiped with two mutually opposing faces in the shape of non-rectangular parallelograms and four substantially rectangular faces. Two or more of such structural members can be welded end to end to form a long feature having a desired length.

Figure 5:
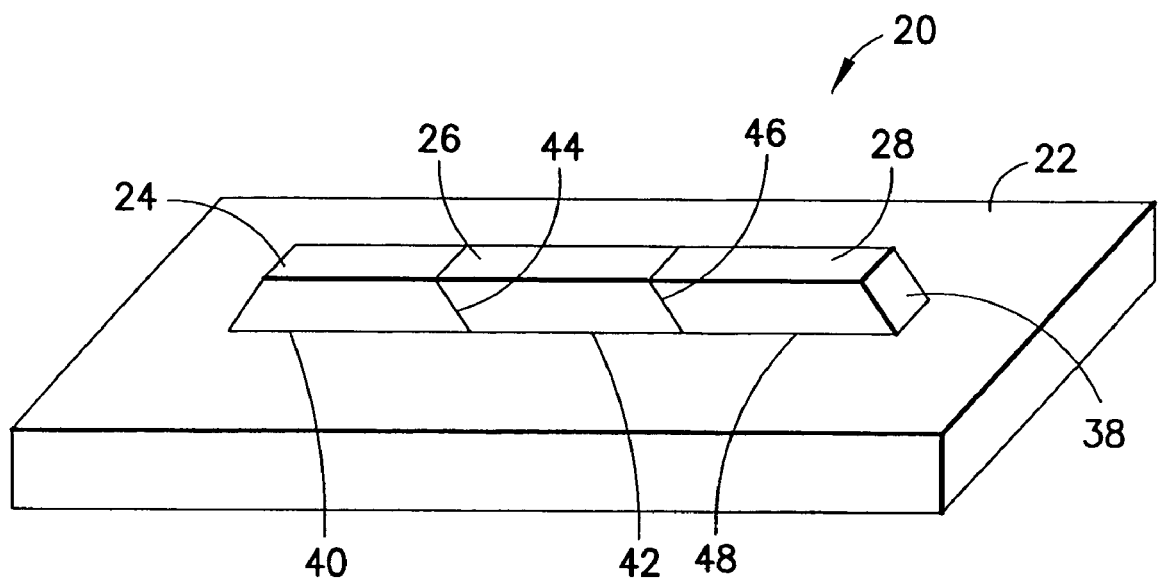
FIG. 5 is a drawing showing an isometric view of the tailored blank upon completion of the first, second and third manufacturing stages depicted in FIGS. 1, 2 and 4 respectively.
Figure 6:
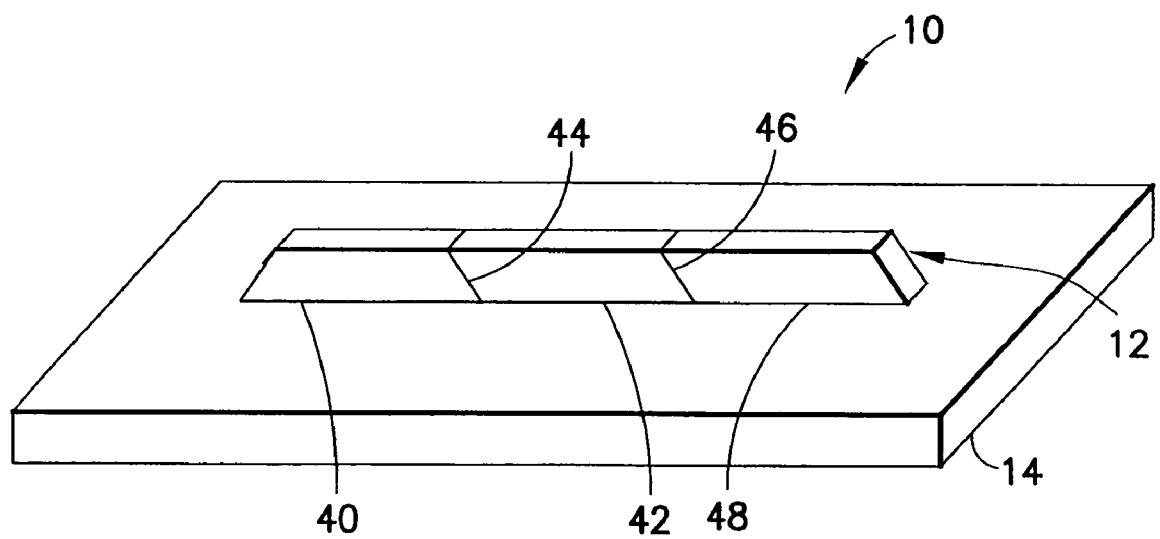
FIG. 6 is a drawing showing an isometric view of a final structural assembly produced by machining the tailored blank depicted in FIG. 5.
Figure 7:
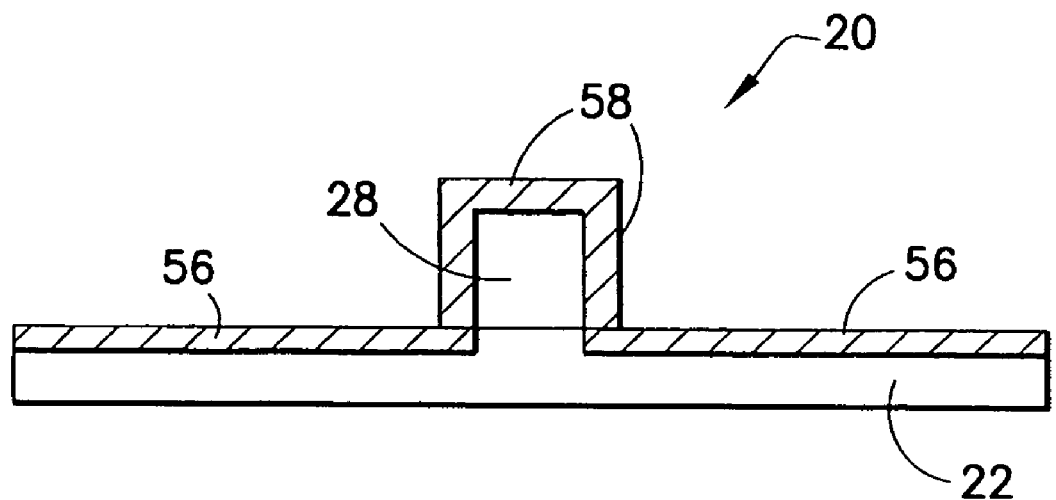
FIG. 7 is a drawing showing an end view of the tailored blank depicted in FIG. 5. The hatched areas indicate portions of the tailored blank removed by machining.
Figure 8:
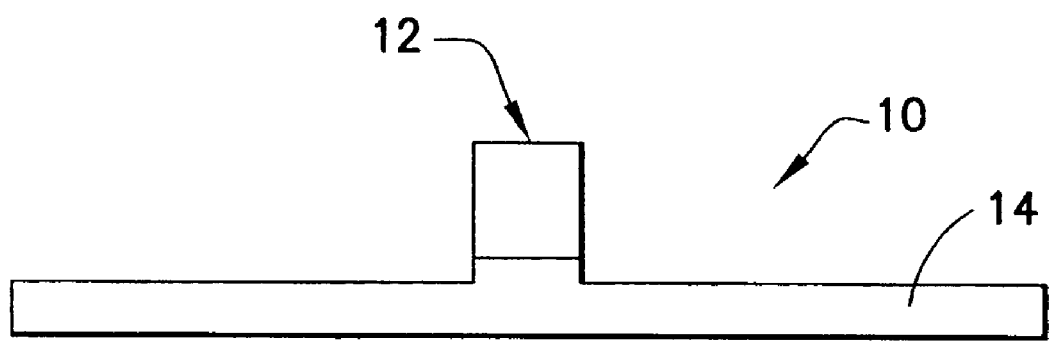
FIG. 8 is a drawing showing an end view of the final structural assembly depicted in FIG. 6 after the machining indicated by hatching in FIG. 7.

Referring to the drawings, in accordance with the first embodiment of the invention, a base member or substrate (which terms are used interchangeably herein) 22 and structural members 24, 26, 28 (see FIGS. 1-4) are friction welded to make a tailored blank 20 (see FIGS. 5 and 7) suitable for use in manufacturing a structural assembly 10 (see FIGS. 6 and 8). The structural assembly 10 illustrated in FIG. 6 includes a flange portion 12 that extends from and substantially normal to a web portion 14. The structural assemblies formed according to the present invention can be formed from tailored blanks, i.e., assemblies of multiple structural members that approximate the desired finished shape of the structural assembly, and which can be machined or otherwise trimmed to the finished shape. For example, FIG. 5 illustrates a tailored blank 20, i.e., a precursor structural assembly before being machined or otherwise trimmed to the desired configuration of the structural assembly 10 depicted in FIG. 6.

The structural assemblies of the present invention can be formed from any number of structural members depending on the desired dimensions and configuration of the structural assembly. Further, the configuration and material composition of the structural members can be formed and selected according to the specifications and design requirements of the final structural assembly. For example, as illustrated in FIGS. 5 and 6, the web portion 14 (see FIG. 6) of the structural assembly 10 is formed by trimming the base member or substrate 22 (see FIG. 5), and the flange portion 12 (see FIG. 6) is formed by trimming the structural members 24, 26, 28 that are joined to the base member 22 (see FIG. 5).

Figure 3:
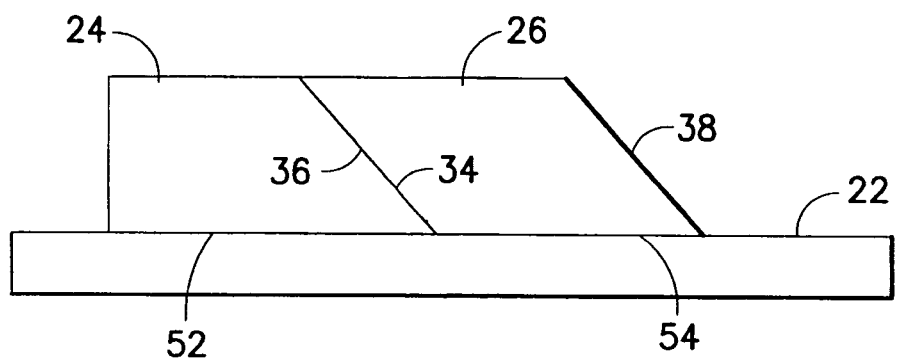
FIG. 3 is a drawing showing a side view of the intermediate tailored blank structure upon completion of the first and second manufacturing stages depicted in FIGS. 1 and 2 respectively.

In the embodiment of a tailored blank depicted in FIG. 5, the base member 22 is a substantially planar member and each of the structural members 24, 26, 28 attached thereto is a beam or bar having a polygonal profile when viewed from the side. As best seen in FIG. 3, the structural member 24 has a substantially trapezoidal profile, while the structural member 26 has a profile that is substantially a non-rectangular parallelogram. In accordance with one implementation, the structural member 24 is a parallelepiped having two mutually substantially parallel faces that are substantially non-rectangular parallelograms, two mutually substantially parallel faces that are substantially rectangles, and two mutually substantially parallel end faces that are substantially rectangles. In accordance with an alternative implementation, the substantially non-rectangular parallelogram-shaped faces of the structural member 26 are not mutually substantially parallel, in which case the end faces would be trapezoidal in shape. The word "substantially" in the phrase "substantially non-rectangular parallelogram" is used in a sense intended to convey that the geometric figure may deviate slightly from a parallelogram shape. For example, the parallelogram may be slightly rounded at the four corners, that is, four precise vertices are not required in order for a face of a structural member to qualify as being a parallelogram. The structural member 28 has the same size, same shape and same profile as those of the structural member 26. While the embodiment depicted in FIG. 5 has a substantially trapezoidal structural member and two substantially non-rectangular parallelogram-shaped structural members, more than two of the latter structural members can be welded end to end to the base member 22 (provided that the latter is extended in length beyond what has been depicted in FIG. 5), extending the length of the attached feature as desired. Alternatively, the substantially trapezoidal structural member can be eliminated, in which case the long feature can be constructed from two or more substantially non-rectangular parallelogram-shaped structural members only.

Advantageously, each of the base member 22 and the structural members 24, 26, 28 can be standard stock items in inventory. As is known in the art, the base and structural members 22, 24, 26, 28 can be formed from a variety of fabricating processes such as milling, casting, die or hand forging, extruding, rolling, and machining. The base and structural members 22, 24, 26, 28 can be formed from materials having high strength-to-weight ratios and good corrosion resistance. For purposes of example only and not limitation, the base and structural members 22, 24, 26, 28 may comprise aluminum, aluminum alloys, titanium, titanium alloys, steel, nickel-based alloys, copper-based alloys, beryllium-based alloys, or mixtures thereof. Further, the base and structural members 22, 24, 26, 28 can be formed from similar or dissimilar materials (provided that the dissimilar materials are of types that can be welded together).

In addition to the material composition and properties of the base and structural members 22, 24, 26, 28, the selection of the members 22, 24, 26, 28 is also based on the desired dimensions of the final structural assembly that is to be formed. More specifically, the desired dimensions of the structural assembly can be determined first, and the base and structural members 22, 24, 26, 28 can then be selected so that the resulting tailored blank 20 will correspond in configuration to the final structural assembly, i.e., the configuration of the tailored blank 20 is such that material can be machined or otherwise removed or reconfigured to achieve the dimensions of the finished structural assembly. Advantageously, by constructing tailored blanks having dimensions and configurations closely or substantially approximating the predetermined dimensions and configuration of the corresponding desired final structural assembly, machining time and material waste can be minimized, making the finished structural assemblies more economical to produce.

The finished structural assemblies manufactured by the methods disclosed herein (such as structural assembly 10 depicted in FIG. 6) can be used as structural components of a vehicle, such as an aircraft, an automobile, or a marine craft. For example, a multiplicity of the structural assemblies can be joined to form a wing, wing support structure, fuselage, and the like of an airplane. Alternatively, the structural assemblies can be used in buildings, machinery, and the like.

Still referring to FIG. 5, the tailored blank 20 is formed by joining the structural members 24, 26, 28 to the base member 22 and joining the structural members 24, 26, 28 to one another. The base member 22 and/or the structural members 24, 26, 28 can then be machined or otherwise trimmed or processed to the dimensions of the finished structural assembly 10 seen in FIG. 6.

Referring now to FIG. 1, a first structural member 24 having a substantially trapezoidal profile is friction welded to the base member 22 by urging structural member 24 against a surface of the base member 22 and causing the structural member 24 to move relative to the base member 22 in a repeating pattern at a high frequency. For example, as shown in FIG. 1, the structural member 24 can be reciprocated in opposite directions 30, 32 along a line while being urged or pressed against the base member 22 in a direction F that is substantially normal to a substantially planar top surface of the base member 22. [Friction welding resulting from relative motion of the welded parts along a line will be referred to herein as "linear friction welding."] The structural member 24 can be urged against the base member 22 and reciprocated by an actuator (not shown), such as an electric, hydraulic, or pneumatic actuator that is coupled to and engaged with the structural member 24 by means of a pair of adjustable jaws 50, clamps, a chuck, or other coupling device. The structural member 24 can be secured to the clamping device bolts, tack welding, tooling, or the like. In the case of jaws 50, each jaw may be provided with a knurled gripping surface for securely gripping the structural member being friction welded. The actuator can oscillate the structural member a distance of about 0.1 inch at a rate of about 60 hertz. Alternatively, other oscillation distances and frequencies can be used. The position limits of the oscillating structural member 24 are indicated by dashed lines in FIG. 1.

The frequency of the reciprocating movement and the applied pressure are selected to cause the materials at the surfaces being rubbed together to plasticize, reaching a state wherein the parts will become fused together when reciprocation ceases and the plasticized material is allowed to fuse while the pressure is still being applied. More specifically, the relative motion between the structural member 24 and the base member 22 generates frictional heating that plasticizes a portion of the structural member 24 and/or a portion of the base member 22. Once sufficient plasticization has occurred, the reciprocating motion of the structural member 24 is terminated. Plasticization can be detected, for example, by mechanical or optical measurements, or friction welding can be continued for a predetermined duration based upon such factors as the type of materials being joined, the size or type of the joint to be formed, and the compressive force therebetween.

After the motion of the structural member 24 has been terminated, the compressive force between the structural member 24 and the base member 22 can be maintained by continuing to urge the structural member 24 in direction F against the base member 22, thereby forming a friction weld joint 40 (indicated in FIG. 2) between the structural member 24 and the base member 22. More precisely, the bottom face (item 52 in FIG. 3) of the structural member 24 and a first corresponding contacting portion of the top surface of the base member 22 form respective substantially planar joining surfaces that are welded to form the joint 40.

It is appreciated that the forces and ranges of motion required for linear friction welding the structural member 24 to the base member 22 can vary according to such factors as the material of the members 22 and 24, the dimensions of the members 22 and 24, the surface finishes of the members 22 and 24, and the like. For example, in accordance with one embodiment of the present invention, in which the members 22 and 24 are formed of aluminum, the structural member 24 is urged in direction F against the base member 22 with a force sufficient to produce a pressure of about 20,000 psi between the structural member 24 and the base member 22, while the structural member 24 is reciprocated about 0.1 inch alternatingly in directions 30, 32 seen in FIG. 1.

In other embodiments of the invention, the first structural member (e.g., structural member 24 seen in FIG. 1) to be friction welded to the base member 22 can be reciprocated in other directions while being urged against the base member. Further, it should be appreciated that while the motion of the structural member 24 is substantially linear in alternating directions, the motion of structural member 24 can have some nonlinear component of motion, e.g., so that the motion of the structural member 24 relative to the base member 22 defines an elliptical path. Alternatively, the first structural member 24 can be joined to the base member 22 by other types of friction weld joints such as rotary friction weld joints. However, the foregoing statements in this paragraph do not apply to friction welding of subsequent structural members, such as structural member 26 seen in FIG. 2, which have two substantially planar joining surfaces that are not coplanar with each other, one joining surface to be joined to the first structural member and the other joining surface to be joined to the base member concurrently with joiner of the one joining surface. In this case, the friction welding must be linear since the relative motion of the parts is constrained by the abutting substantially planar joining surfaces of the first structural member and the base member.

As illustrated in FIG. 1, the structural member 24 further comprises a substantially planar joining surface 34 at one end face, which surface extends from the substantially planar top surface of the base member 22 at an oblique angle relative thereto. The substantially planar joining surfaces 34 and 52 of the structural member 24 (see FIG. 3) define an acute angle. Further, the joining surface 34 can be shaped after the structural member 24 has been joined to the base member 22, thereby modifying the angle of inclination of the joining surface 34. However, in accordance with the first embodiment of the invention shown in FIGS. 1-8, the joining surface 34 is not substantially normal to the substantially planar top surface of the base member 22.

Thereafter, a second structural member 26 is concurrently joined to the base member 22 and to the structural member 24 by linear friction welding. As previously described, the side faces of the structural member 26 are substantially non-rectangular parallelogram shaped. The end faces 36 and 38 (later referred to as joining surfaces 36 and 38) of the structural member 26 are inclined relative to the substantially planar top surface of the base member 22 at the same oblique angle at which joining surface 34 of the structural member 24 is inclined.

Initially, the structural member 26 is placed between the previously described jaws 50, which grasp the structural member 26. The jaws 50 are initially positioned such that structural member 26 occupies the position shown in FIG. 3, wherein the substantially planar joining surface 36 of the structural member 26 abuts the substantially planar joining surface 34 of the structural member 24 and at the same time the bottom face of the structural member 26 forms a substantially planar joining surface 54 that abuts a second corresponding contacting portion of the top surface of the base member 22. The first and second corresponding contacting portions of the top surface of the base member 22 are adjacent, meaning that the bottom faces of the first and second structural members 24 and 26 are adjacent as shown in FIG. 3.

Figure 2:
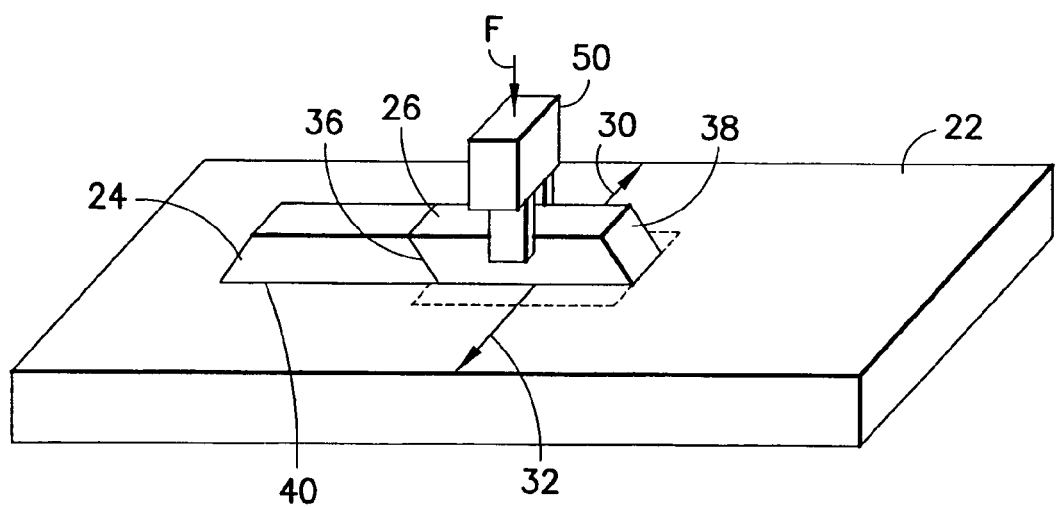
FIG. 2 is a drawing showing an isometric view of a second stage in the manufacture of a tailored blank in accordance with the first embodiment of the invention wherein a second structural member is being joined to the structure seen in FIG. 1 by linear friction welding.

Referring now to FIG. 2, the second structural member 26 having a substantially non-rectangular parallelogram-shaped profile is friction welded to the base member 22 by causing the structural member 26 to reciprocate relative to the base member 22 in opposite directions 30, 32 along a line while being urged or pressed against the base member 22 in a direction F that is substantially normal to a substantially planar top surface of the base member 22. At the same time, a vector component of the force being exerted in direction F presses the joining surface 36 of the structural member 26 against the joining surface 34 of the structural member 24. The structural member 26 can be urged against the base member 22 and reciprocated by an actuator (not shown), such as an electric, hydraulic, or pneumatic actuator that is coupled to and engaged with the structural member 26 by means of jaws 50, clamps, a chuck, or other coupling device. The position limits of the oscillating (i.e., reciprocating) structural member 26 are indicated by dashed lines in FIG. 2.

Figure 4:
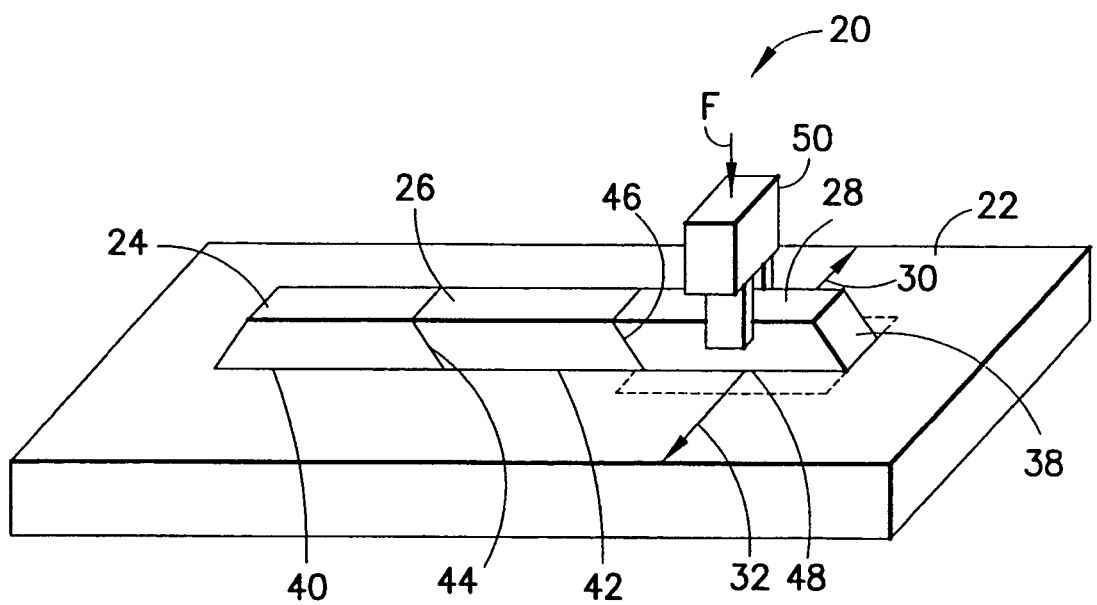
FIG. 4 is a drawing showing an isometric view of a third stage in the manufacture of a tailored blank in accordance with the first embodiment of the invention wherein a third structural member is being joined to the tailored blank structural assembly seen in FIG. 3 by linear friction welding.

The relative motion between the structural member 26 and the precursor structure formed by welding the structural member 24 to the base member 22 generates frictional heating that plasticizes respective portions of the structural members 24 and 26 at the interface of the joining surfaces 34 and 36, forming an inclined weld joint 44 (indicated in FIG. 4), and that concurrently plasticizes respective portions of the structural member 26 and the base member 22 at the interface of the joining surface 54 of the structural member 26 and the second corresponding contacting portion of the top surface of the base member 22, forming weld joint 42 (indicated in FIG. 4).

Once sufficient plasticization has occurred, the reciprocating motion of the structural member 26 is terminated. Thereafter, the compressive force between the structural member 26 and the base member 22 is maintained by continuing to urge the structural member 26 in direction F against the base member 22, thereby forming friction weld joint 42 (indicated in FIG. 4) between the structural member 26 and the base member 22. More precisely, the bottom face (item 54 in FIG. 3) of the structural member 24 and the second corresponding contacting portion of the top surface of the base member 22 form respective substantially planar joining surfaces that are welded to form the weld joint 42 (shown in FIG. 4).

As illustrated in FIG. 2, the structural member 26 further comprises a third substantially planar joining surface 38 at the other end face, which surface extends from the substantially planar top surface of the base member 22 at an oblique angle relative thereto. The substantially planar joining surfaces 38 and 54 of the structural member 26 (see FIG. 3) define an acute angle that is the same as the angle defined by the substantially planar joining surfaces 34 and 52 of the structural member 24.

Thereafter, a third structural member 28 is concurrently joined to the base member 22 and to the structural member 26 by linear friction welding, which operation is depicted in FIG. 4. Preferably, the size and shape of structural member 28 are substantially the same as those of structural member 26. The end faces of the structural member 28 are inclined relative to the substantially planar top surface of the base member 22 at the same oblique angle at which the joining surfaces 36 and 38 of the structural member 26 were inclined.

Initially, the structural member 28 is placed between the previously described jaws 50, which grasp the structural member 28. The jaws 50 are initially positioned such that structural member 28 occupies the position shown in FIG. 4, wherein the joining surface 36 of the structural member 28 abuts the joining surface 38 of the structural member 26 and at the same time the bottom face of the structural member 28 forms a substantially planar joining surface that abuts a third corresponding contacting portion of the top surface of the base member 22. The second and third corresponding contacting portions of the top surface of the base member 22 are adjacent, meaning that the bottom faces of the second and third structural members 26 and 28 are adjacent.

Referring now to FIG. 4, the third structural member 28 having a substantially non-rectangular parallelogram-shaped profile is friction welded to the base member 22 by causing the structural member 28 to reciprocate relative to the base member 22 in opposite directions 30, 32 along a line while being urged or pressed against the base member 22 in a direction F that is substantially normal to a substantially planar top surface of the base member 22. At the same time, a vector component of the force being exerted in direction F presses the joining surface 36 of the structural member 28 against the joining surface 38 of the structural member 26. The structural member 26 can be urged against the base member 22 and reciprocated by means previously described with reference to FIG. 2. The position limits of the oscillating (i.e., reciprocating) structural member 28 are indicated by dashed lines in FIG. 4.

Again, the relative motion between the structural member 28 and the intermediate structure formed by welding the structural members 24 and 26 to the base member 22 and to each other generates frictional heating that plasticizes respective portions of the structural members 26 and 28 at their interface and that concurrently plasticizes respective portions of the structural member 28 and the base member 22 at their interfaces. Once sufficient plasticization has occurred, the reciprocating motion of the structural member 28 is terminated. Thereafter, the compressive force between the structural member 28 and the base member 22 is maintained by continuing to urge the structural member 28 in direction F against the base member 22, thereby forming friction weld joints 46 and 48 indicated in FIG. 4.

As illustrated in FIG. 4, the structural member 26 further comprises a third substantially planar joining surface 38 at the other end face, which surface extends from the substantially planar top surface of the base member 22 at an oblique angle relative thereto. A fourth structural member having the same size and shape as those of the second and third structural members 26 and 28 can then be linear friction welded to the third joining surface 38 of structural member 28 and a fourth corresponding contacting portion of the top surface of the base member 22. Depending on the desired length of the long flange or other long feature being built on the base member, as many structural members having a substantially non-rectangular parallelogram-shaped profile as needed can be successively welded in place to increase the length of the long feature.

After all of the structural members 24, 26, 28 have been welded in place, as illustrated in FIG. 5, the resulting structure forms a tailored blank 20, which corresponds to the dimensions and configuration of the desired final structural assembly, so that the tailored blank 20 can be machined or otherwise trimmed or processed to form the final structural assembly 10 seen in FIG. 6. The tailored blank 20 can be trimmed by any known means, including using a manual or computer-guided machining device, such as a computer numeric control (CNC) machine. During machining, portions of the base member 22 and/or the structural members 24, 26, 28 can be removed. Preferably, the tailored blank 20 is trimmed according to predetermined dimensions corresponding to a desired configuration of the structural assembly 10, as shown by the hatched areas in FIG. 7. The hatched regions 56 represent material removed from the base member 22, while the hatched inverted U-shaped area 58 represent material removed from the structural member 28. Material removed during the trimming operation from structural members 24 and 26 (which are hidden behind the structural member 28 in the end view depicted in FIG. 7) is not shown in FIG. 7. Also not shown in FIG. 7 is that flash produced during the friction welding operations can also be removed by trimming. An end view of the final structural assembly 10 having a long flange portion 12 joined to a web portion 14 is shown in FIG. 8.

For the purpose of illustration, an embodiment has been disclosed in which the substantially non-rectangular parallelogram-shaped structural members are beams or bars. Alternatively, the substantially non-rectangular parallelogram-shaped structural members can be plates. The use of substantially non-rectangular parallelogram-shaped structural members to build a long feature eliminates the need for connector pieces of the type disclosed in U.S. Patent Appln. Publ. No. US 2005/0127140 A1.

In accordance with a second embodiment of the invention, one structural member or feature can be friction welded to a base member and to another structural member or feature already welded to that base member using upset force in either two different directions or a vector combination direction. In accordance with this method, a second structural feature is joined to mutually substantially orthogonal joining surfaces of a base member and a first structural feature welded to that base member by linearly oscillating the second structural feature while first and second upset forces are being applied in mutually substantially orthogonal directions that are substantially normal to the aforementioned joining surfaces of the base member and first structural member. The second embodiment differs from the first embodiment in that the joining surfaces of the structural features are substantially normal instead of oblique relative to the substantially planar top surface of the base member, which orientation necessitates the application of an upset force or vector component thereof in a direction substantially normal to those joining surfaces.

Figure 9:
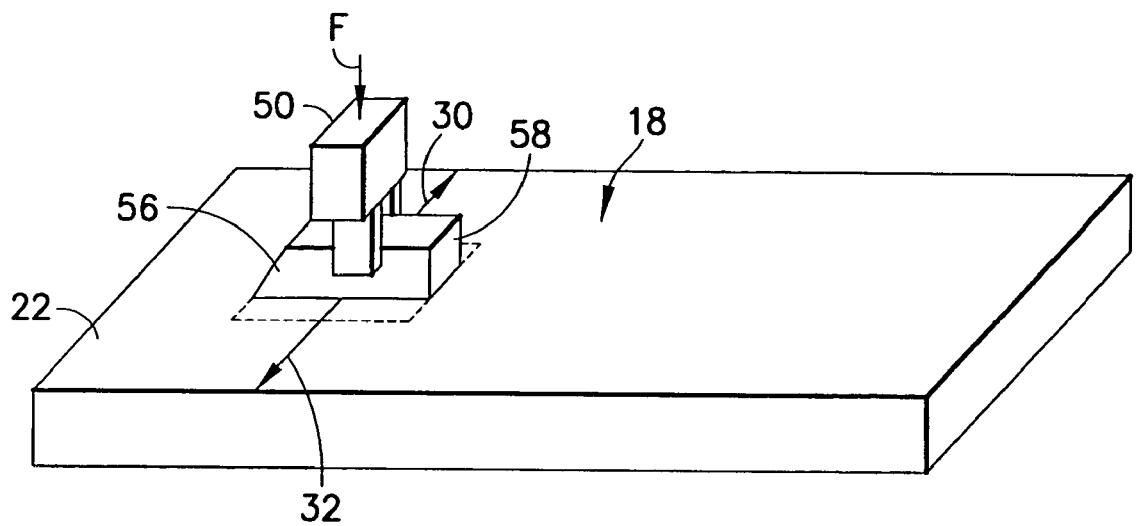
FIG. 9 is a drawing showing an isometric view of a first stage in the manufacture of a tailored blank in accordance with a second embodiment of the present invention wherein a first structural member is being joined to a base member or substrate by friction welding.
Figure 10:
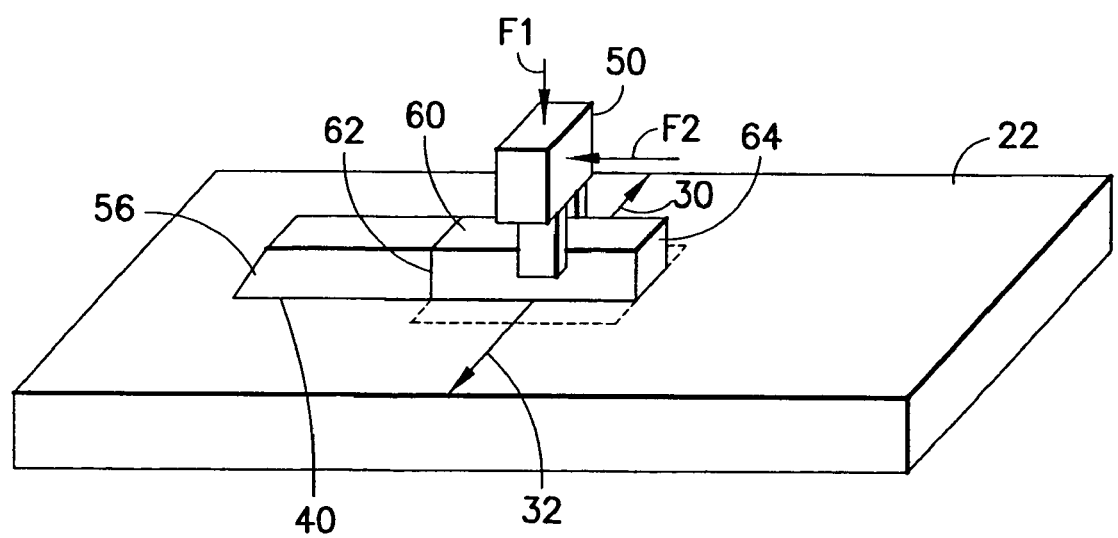
FIG. 10 is a drawing showing an isometric view of a second stage in the manufacture of a tailored blank in accordance with the second embodiment of the invention wherein a second structural member is being joined to the structure seen in FIG. 9 by linear friction welding using two-direction upset force.

One implementation of the second embodiment is shown in FIGS. 9 and 10. Referring now to FIG. 9, a first structural member 56 having a substantially trapezoidal profile is placed with its substantially planar bottom face abutting a first portion of a substantially planar top surface of a base member 22. The structural member 56 has a substantially planar end face 58 that is disposed substantially normal to the top surface of the base member. The structural member 56 is friction welded to the base member 22 by applying a downward force that presses the bottom face of structural member 56 against the top surface of the base member 22 and then moving structural member 56 relative to base member 22 in a repeating pattern at a high frequency while the downward force is still being applied. For example, as shown in FIG. 9, the structural member 56 can be reciprocated in opposite directions 30, 32 along a line while being urged or pressed against the base member 22 in a direction F that is substantially normal to a substantially planar top surface of the base member 22. The structural member 56 can be urged against the base member 22 and reciprocated by an actuator that is coupled to and engaged with the structural member 56 by means of a pair of adjustable jaws 50 or other clamping or coupling device. Optionally, the motion of structural member 56 can have some nonlinear component of motion. The position limits of the oscillating structural member 56 are indicated by dashed lines in FIG. 9.

The frequency of the reciprocating movement and the applied pressure are again selected to cause the materials at the surfaces being rubbed together to plasticize, reaching a state wherein the parts will become fused together when reciprocation ceases. After the motion of the structural member 56 has been terminated, the compressive force between the structural member 56 and the base member 22 is maintained, thereby forming a friction weld joint 40 (indicated in FIG. 10) between the structural member 56 and the base member 22.

Thereafter, a second structural member 60 is concurrently joined to the base member 22 and to the structural member 56 by linear friction welding with upset forces being applied in two mutually substantially orthogonal directions F1 and F2 indicated in FIG. 10. In accordance with one implementation of the second embodiment, the side faces of the structural member 60 are substantially planar and substantially rectangular. The end faces 62 and 64 of the structural member 60 are also substantially planar and are disposed substantially normal to the substantially planar top surface of the base member 22.

Initially, the structural member 60 is placed between the previously described jaws 50, which grasp the structural member 60. The jaws 50 are initially positioned such that structural member 60 occupies the position shown in FIG. 10, wherein its bottom face is abutting the substantially planar top surface of the base member 22 and end face 62 is abutting the end face 58 of the first structural member 56. In this position, the bottom face of the structural member 60 is adjacent to the weld joint 40. Then the second structural member 60 is linear friction welded to the base member 22 by causing the structural member 60 to reciprocate relative to the base member 22 in opposite directions 30, 32 along a line while being urged or pressed against the base member 22 in a direction F1 that is substantially normal to a substantially planar top surface of the base member 22 and while being urged or pressed against the structural member 56 in a direction F2 that is substantially normal to the end face 58 of the structural member 56. The structural member 60 can be reciprocated by an actuator (not shown) that is coupled to and engaged with the structural member 26 by means of jaws 50. Separate upset forces can be applied to the jaws by respective force-generating devices (not shown). Alternatively, a force vector that is the sum of the vectors F1 and F2 can be applied to the jaws by a solitary force-generating device. The position limits of the oscillating (i.e., reciprocating) structural member 60 are indicated by dashed lines in FIG. 10.

The relative motion between the structural member 60 and the precursor structure formed by welding the structural member 56 to the base member 22 generates frictional heating that plasticizes respective portions of the structural members 56 and 60 at the interface of the joining surfaces 58 and 62, forming a vertical weld joint, and that concurrently plasticizes respective portions of the structural member 60 and the base member 22 at the interface of the bottom face of the structural member 60 and the contacting portion of the top surface of the base member 22, forming a horizontal weld joint.

Figure 11:
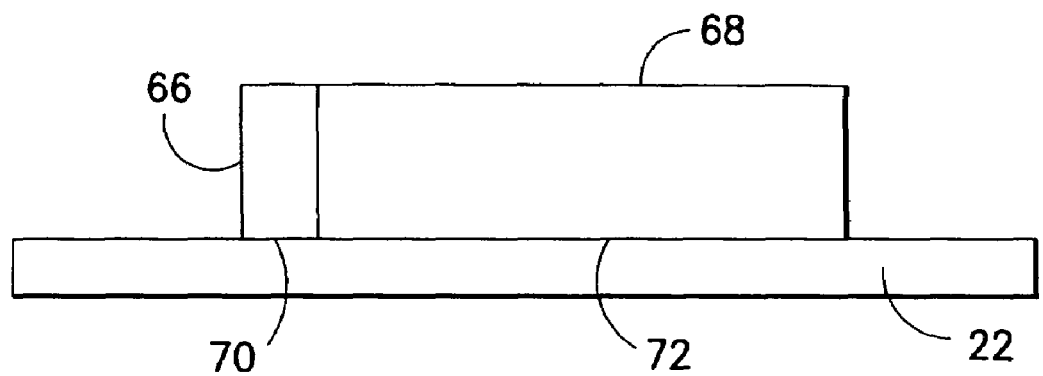
FIGS. 11 and 12 are drawings showing side and top views respectively of a tailored blank comprising a flange portion and a stiffener joined to each other and to a base member by a method involving a step of linear friction welding using two-direction upset force.
Figure 12:
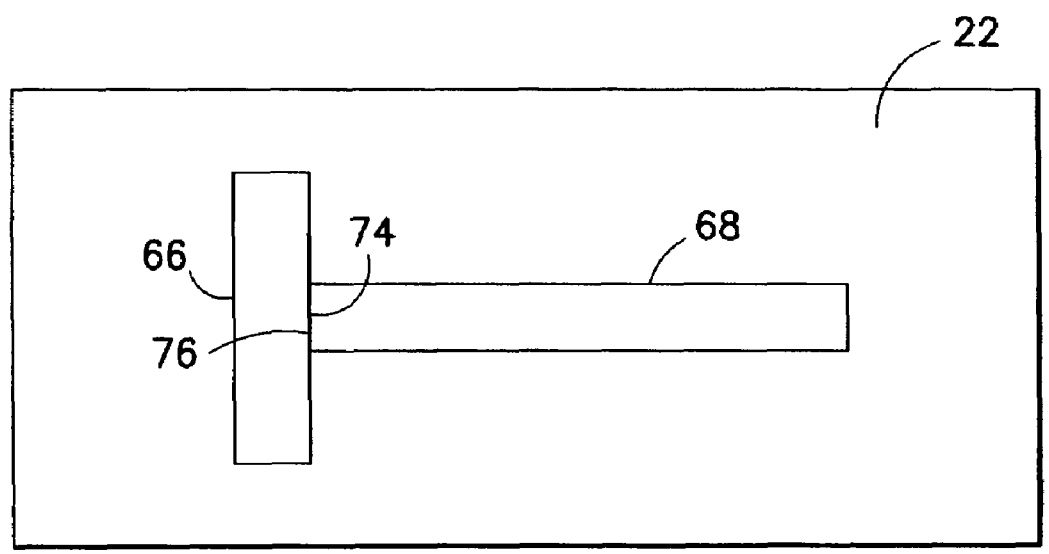

In accordance with a further implementation of the second embodiment shown in FIGS. 11 and 12, a tailored blank comprising a flange portion 66 and a stiffener 68 are joined to each other and to a base member 22 using linear friction welding with two-direction upset force. In accordance with one method of manufacture, a plate-shaped stiffener 68 is positioned with its bottom face 72 abutting a first portion of the substantially planar top surface of the base member 22. The previously described means are used to oscillate the stiffener 68 relative to the base member 22 while a downward force is applied on the top face of the stiffener 68, thereby pressing the bottom face 72 of the stiffener against the base member during oscillation. When sufficient material at the interface of the bottom face 72 of the stiffener 68 and the top surface of the base member 22 has been plasticized, the oscillatory motion is terminated while the compressive force is maintained until the plasticized material has formed a weld joint.

Thereafter a flange portion 66 is positioned with a portion of a side face 74 of the flange portion abutting an end face 76 of the stiffener 68 and with a bottom face 70 of the flange portion 66 abutting a second portion of the substantially planar top surface of the base member 22. The faces 74 and 76 are substantially planar surfaces disposed substantially normal to the substantially planar top surface of the base member 22. Then upset forces are applied to the flange portion 66 from two directions: a first direction substantially normal to the plane of the top surface of the base member 22 and a second direction substantially normal to the plane of the end face 76 of the stiffener 68. Alternatively, a force which is the vector combination of the foregoing two upset forces is exerted on the stiffener 68. Then the flange portion 66 is reciprocated at high frequency in the manner previously described to generate sufficient frictional heat that the rubbing surfaces plasticize. Then the reciprocation of the flange portion 66 is terminated while maintaining the force or forces that press the faces of the flange portion 66 against the stiffener 68 and the base member 22 respectively. As a result, the flange portion 66 will be welded in place as shown in FIGS. 11 and 12.

As should be apparent to a person skilled in the art, the sequence of friction welding steps may be reversed in the example depicted in FIGS. 11 and 12. The flange portion 66 can be friction welded to the base member first and then the stiffener 68 can be friction welded to the flange portion and to the base member by applying upset forces from two directions.

Many modifications and other embodiments of the invention will come to mind to one skilled in the art to which this invention pertains having the benefit of the teachings presented in the foregoing descriptions and the associated drawings. For example, the structural members can be processed before and/or after joining by friction welding. Such processing can include cleaning the joining surfaces of the structural members to remove oxidation or surface defects. Additionally, the structural members can be heat treated by aging, quenching, stretching, annealing, or solution annealing to obtain desired mechanical or chemical properties, as is known in the art. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

The invention claimed is:

1. A method of making a tailored blank comprising the following steps:
   (a) friction welding a first joining surface of a first structural member having a non-rectangular parallelogram-shaped profile to a first portion of a surface of a substrate; and
   (b) concurrently linear friction welding first and second joining surfaces of a second structural member to a second portion of the surface of the substrate and to a second joining surface of the first structural member respectively, said second structural member consisting of a solid comprising a first face in the shape of a non-rectangular parallelogram, a second face that is contiguous with said first face and substantially rectangular, and a third face that is contiguous with said first and second faces and disposed at an oblique angle relative to said second face, said first joining surface being said second face and said second joining surface being said third face,
   wherein the first and second portions of the surface of the substrate are adjacent.

2. The method as recited in claim 1, wherein the first and second structural members have substantially the same size and shape.

3. The method as recited in claim 1, further comprising the step, performed prior to steps (a) and (b), of friction welding a first joining surface of a third structural member to a third portion of the surface of the substrate, said third structural member consisting of a parallelepiped having a substantially polygonal profile, wherein during step (a), a second joining surface of the first structural member is concurrently friction welded to a second joining surface of the third structural member, and the first and third portions of the surface of the substrate are adjacent.

4. The method as recited in claim 1, wherein during step (b), a force is applied on the second structural member in a direction substantially normal to a plane of the surface of the substrate.

5. A method of making a tailored blank comprising the following steps:
   (a) friction welding a first joining surface of a first structural member to a first portion of a joining surface of a substrate; and
   (b) concurrently linear friction welding first and second joining surfaces of a second structural member to a second portion of the surface of the substrate and to a second joining surface of the first structural member respectively,
   wherein the first and second portions of the surface of the substrate are adjacent, and the second joining surfaces of the first and second structural members are mutually substantially parallel and substantially normal to the substrate.

6. The method as recited in claim 5, wherein step (b) comprises the step of concurrently applying a first force on the second structural member in a first direction that is substantially normal to the surface of the substrate and a second force on the second structural member in a second direction that is substantially normal to the second joining surface of the first structural member.

7. The method as recited in claim 5, wherein step (b) comprises the step of applying a force on the second structural member in a direction that lies at an oblique angle relative to the surface of the substrate.

8. A method of making tailored blanks comprising the following steps:
   (a) placing a first structural member having a cross section that is substantially nonrectangular parallelogram shaped in abutting relationship with a structure comprising first and second surfaces disposed at an oblique angle, the first structural member comprising first and second surfaces that intersect at said oblique angle, a third surface substantially parallel to the first surface, and a fourth surface substantially parallel to the second surface, the first surface of the first structural member abutting a first portion of the first surface of the structure and the second surface of the first structural member abutting the second surface of the structure;
   (b) applying a force on the first structural member to respectively urge the first and second surfaces of the first structural member against the first and second surfaces of the structure; and
   (c) alternatingly displacing the first structural member in mutually opposite directions substantially parallel to the longitudinal axis of the first structural member while step (b) is being performed, causing frictional heat to be generated at a first interface where the first surfaces of the structure and the first structural member rub together and at a second interface where the second surfaces of the structure and the first structural member rub together,
   wherein step (c) is halted after material at the first and second interfaces becomes plasticized and while step (b) is being performed, step (b) being continued until the plasticized material at the first and second interfaces forms a weld.

9. The method as recited in claim 8, further comprising the following steps performed after steps (a) through (c) have been completed:
   (d) placing a second structural member having a cross section that is substantially non-rectangular parallelogram shaped in abutting relationship with the structure and the first structural member, the second structural member comprising first and second surfaces that intersect at said oblique angle, a third surface substantially parallel to the first surface, and a fourth surface substantially parallel to the second surface, the first surface of the second structural member abutting a second portion of the first surface of the structure and the second surface of the second structural member abutting the fourth surface of the first structural member;
   (e) applying a force on the second structural member to urge the first surface of the second structural member against the first surface of the structure and urge the second surface of the second structural member against the fourth surface of the first structural member; and (f) alternatingly displacing the second structural member in mutually opposite directions substantially parallel to the longitudinal axis of the second structural member while step (e) is being performed, causing frictional heat to be generated at a third interface where the first surfaces of the structure and the second structural member rub together and at a fourth interface where the second surface of the second structural member and the fourth surface of the first structural member rub together, wherein step (f) is halted after material at the third and fourth interfaces becomes plasticized and while step (e) is being performed, step (b) being continued until the plasticized material at the third and fourth interfaces forms a weld.

10. The method as recited in claim 9, wherein the first and second structural members are made of the same material and have substantially the same size and shape.

11. The method as recited in claim 9, wherein before steps (a) through (c) are performed, said structure is constructed by the following steps:

(g) placing a third structural member having a polygonal cross section in abutting relationship with a surface of a substrate, the third structural member comprising first and second surfaces that intersect at an acute angle that is the supplement of said oblique angle, a third surface substantially parallel to the first surface, and a fourth surface that is not parallel to the second surface, the surface of the substrate comprising respective portions that are the first and second portions of the first surface of the structure, the first surface of the third structural member abutting a portion of the surface of the substrate that is adjacent to the portion of the surface of the substrate that is the first portion of the first surface of the structure;

(h) applying a force on the third structural member to urge the first surface of the third structural member against the surface of the substrate; and (i) repeatedly displacing the third structural member relative to the substrate in a predetermined pattern while step (h) is being performed, causing frictional heat to be generated at a fifth interface where the first surface of the third structural member and the surface of the substrate rub together, wherein step (i) is halted after material at the fifth interface becomes plasticized and while step (h) is being performed, step (h) being continued until the plasticized material at the fifth interface forms a weld.

12. The method as recited in claim 11, wherein the first through third structural members are disposed substantially within a plane and force is applied in a direction substantially normal to that plane.

* * * * *